Patented Dec. 4, 1945

2,390,272

UNITED STATES PATENT OFFICE 2,390,272

PURIFICATION OF GELATINOUS HYDROXIDES

August H. Riesmeyer and Vernon M. Stowe, Collinsville, Ill., assignors to Aluminum Company of America, Pittsburgh, Pa., a corporation of Pennsylvania No Drawing. Application September 29, 1943, Serial No. 504,268

5 Claims. (Cl. 23—143)

This invention relates to the removal of impurities from gelatinous hydroxides, and relates particularly to the removal of alkali metal ions from such hydroxides.

Gelatinous hydroxides ordinarily contain various impurities, in addition to a large amount of free and combined water, as a result of the particular method and materials used in their production. Thus, when the hydroxides are prepared by a process involving the use of an alkaline solution containing alkali metal ions, the hydroxides likewise contain alkali metal ions. For example, when gelatinous aluminum hydroxide is precipitated by mixing a sodium aluminate solution and a sodium bicarbonate solution the precipitate contains a sodium compound or compounds (usually referred to as soda—$Na_2O$). Even after filtering and washing the hydroxide to remove the leachable alkali, an appreciable amount of the alkali metal remains in a form in which it is not readily removed by usual washing methods.

When such gelatinous hydroxides are dried to hard, porous, vitreous form, they are useful as catalysts and catalyst supports in a wide variety of processes, and as adsorbents for removing moisture and other impurities from gases and liquids. However, the presence of alkali metal ions and other impurities in the catalyst or adsorbent is objectionable in many cases. Hence, it is customary to wash the gelatinous hydroxide or the dried product, or both, with water or with various acid or salt solutions intended to convert impurities to soluble form so that they can be washed out readily.

However, prolonged washing to remove impurities which do not wash out easily tends to cause many gelatinous hydroxides to re-disperse and become slimy, which impedes the removal of the impurities, and in addition makes the hydroxide difficult to filter from the wash liquid. If the gelatinous hydroxide is dried, prior to washing it, to a point where it contains a relatively small amount of water, the above mentioned difficulty is avoided, but the product crumbles into fine particles during the washing operation and as a result is unsuitable for many purposes.

It is an object of this invention to provide an improved method by which impurities, and particularly alkali metal ions, present in gelatinous hydroxides are removed. It is a further object of this invention to provide a process for readily producing a material of low alkali metal content from alkaline gelatinous hydroxides containing alkali metal ions.

In accordance with this invention, a mineral acid, such as sulfuric acid or nitric acid, or an organic acid, such as acetic acid, is added to an alkaline gelatinous hydroxide—preferably after filtering and washing the hydroxide sufficiently to remove the readily soluble impurities—to convert the alkali metal values present to a readily soluble salt. Preferably enough acid is added to lower the pH of the gelatinous hydroxide to about 7; the amount of acid used should not be sufficient to peptize the material. The mass is then dried to a water content of from 50–70 per cent by weight and washed thoroughly with water. At such a water content it can be washed at length without re-dispersing and becoming slimy, and without crumbling or decrepitating unduly; below a water content of 60 per cent some decrepitation takes place but the particles are not too small for many purposes if the water content is not lower than 50 per cent. After the washing operation, the mass may be dried further to convert it to hard, porous material.

The initial drying operation mentioned can be readily effected by heating the gelatinous material at a temperature of about 150–200° C. The further drying of the material to remove most or all of its water content after the treatment with acid can be accomplished satisfactorily at temperatures of about 300–500° C. for a suitable length of time. Where it is desired that the product be adsorbent it should not be completely dehydrated; a total water content of about 2–15 per cent by weight is ordinarily desirable.

When material which has been dried to a water content of 50–70 per cent is to be subjected to the further drying operation described above after the washing operation, it is preferable in carrying out the treatment with acid to use an acid which will volatilize readily in that drying operation, so that in the drying process the product is freed of acid ions which might otherwise be present. Acetic acid and nitric acid are examples of acids which can be driven off readily in this manner when the hydroxide is heated at 300–500° C.

This invention is applicable to gelatinous hydroxides generally which re-disperse or become slimy on washing with water or acids, such as hydroxides of aluminum, iron, tin, nickel, manganese, cobalt, chromium, copper, zinc, gallium, and the like, singly or as mixtures. Likewise, it is applicable to such hydroxides whether they are produced as gelatinous precipitates or as hydrogels. By means of the invention it is readily possible to produce from alkaline gelatinous hydroxides materials having a soda content as low as 0.01 per cent of the weight of the metal oxide content.

The following example illustrates the operation of the invention and the results produced thereby.

Gelatinous aluminum hydroxide was precipitated by rapidly mixing a sodium aluminate solution containing 64 grams per liter of sodium aluminate with a sodium bicarbonate solution containing 70 grams per liter of sodium bicarbonate, the two solutions being at temperatures of 100° C. and 30° C., respectively. After the precipitate was filtered and washed with water it contained sodium compounds, calculated as soda ($Na_2O$), equal to 2 per cent of the dry weight of the alumina of the mass, and had a pH of 10.5 as measured by a glass electrode. The precipitate was then mixed with enough 95 per cent acetic acid solution to lower the pH of the mass to about 7. It was next dried at 190° C. to a total water content of 60 per cent by weight and was then leached five times with an equal volume of water. The mass neither re-dispersed nor crumbled during the leaching operation. The resulting material, when filtered and heated at 450° C. to a water content of 4.5 per cent by weight, contained soda equal to only 0.03 per cent of the dry weight of the alumina present and contained no acetic acid ions.

We claim:

1. The process of removing impurities from alkaline gelatinous hydroxides, comprising the steps of washing the hydroxide with water, adding an acid to the hydroxide in an amount insufficient to peptize the hydroxide, partially drying the hydroxide, and subsequently washing the resulting product.

2. The process of removing impurities from alkaline gelatinous hydroxides, comprising the steps of washing the hydroxide with water, adding an acid to the hydroxide in an amount insufficient to peptize the hydroxide, partially drying the hydroxide to a total water content of from 50–70 per cent by weight, and subsequently washing the resulting product.

3. The process of producing hard, porous material of low alkali metal ion content from alkaline gelatinous hydroxides containing alkali metal values, comprising the steps of washing the hydroxide with water, adding an acid to the gelatinous hydroxide in an amount insufficient to peptize the hydroxide, partially drying the hydroxide to a total water content of from 50 to 70 per cent by weight, washing the resulting material, and thereafter drying it to hard, porous form.

4. The process of producing hard porous material of low alkali metal ion content from alkaline gelatinous hydroxides containing alkali metal values, comprising the steps of washing the hydroxide with water, adding an acid to the gelatinous hydroxide in an amount insufficient to peptize the hydroxide, partially drying the hydroxide to a total water content of from 50 to 70 per cent by weight, washing the resulting material, and thereafter drying it to hard, porous form at a temperature sufficient to volatilize acid remaining from said acid treatment.

5. The process of removing impurities from alkaline, acid-soluble, gelatinous hydroxides, comprising the steps of adding an acid to the hydroxide in an amount insufficient to peptize the hyroxide, partially drying the hydroxide, and subsequently washing the resulting product.

AUGUST H. RIESMEYER.
VERNON M. STOWE.